United States Patent [19]

Julier et al.

[11] 3,727,221
[45] Apr. 10, 1973

[54] ERROR MEASURING DEVICE FOR A MONOPULSE TRACKING RADAR SYSTEM

[76] Inventors: Rene P. G. Julier, 89 Rue du Moulin du Piere, Hauts-de-seine; Marc J. T. Schneider, 50 avenue Pasteur, 78 La Celle 8th, Yvelines, both of France

[22] Filed: May 18, 1970

[21] Appl. No.: 38,311

[52] U.S. Cl. .................. 343/7.3, 343/7.4, 343/16 M
[51] Int. Cl. .............................. G01s 9/14, G01s 9/22
[58] Field of Search .................. 343/7.3, 7.4, 7.7, 343/16 M

[56] References Cited

UNITED STATES PATENTS

| 2,745,095 | 5/1956 | Stoddard | 343/7.3 X |
| 3,166,745 | 1/1965 | Engledew et al. | 343/7 A X |
| 3,564,547 | 2/1971 | Dent | 343/7.3 |
| 3,550,126 | 12/1970 | Van Hijfte et al. | 343/7.4 X |
| 3,230,526 | 1/1966 | Tanter et al. | 343/7.7 |
| 3,249,934 | 5/1966 | Hague | 343/16 M X |
| 3,467,963 | 9/1969 | Van Popta | 343/16 M |
| 3,522,604 | 8/1970 | Gillmer et al. | 343/7.7 X |

Primary Examiner—Malcolm F. Hubler
Attorney—C. Cornell Remsen, Jr., Walter J. Baum, Paul Hemminger, Charles L. Johnson, Jr. and Thomas E. Kristofferson

[57] ABSTRACT

A coherent monopulse radar system for ground target tracking and evaluation of angular error between primary and secondary (such as shell burst phenomena) targets. Stroboscopic sampling of the received signals is provided, and each sampling circuit output is equipped with two Doppler filters, one for slow moving targets and the other for fast moving targets. The Doppler filters are switchable at will. Range and azimuth tracking circuits are included as is apparatus for measuring and displaying the range and azimuth of the secondary target with respect to the coordinates of the primary target during continuous primary target tracking.

2 Claims, 11 Drawing Figures

Inventors
René Paul Georges Julier
Marc Jules Theodore Schneider

By William F. O'Neil
Agent

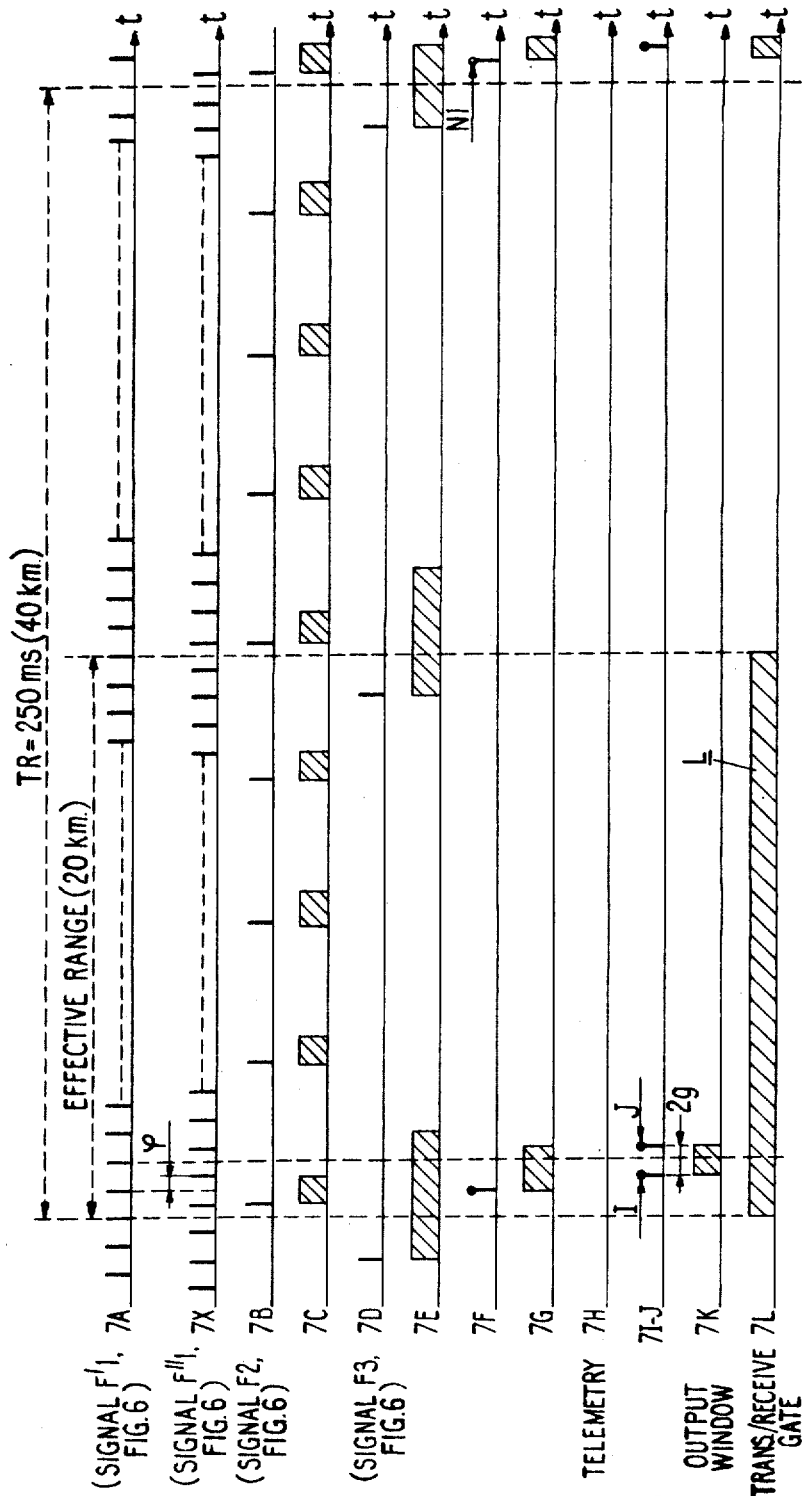

ERROR MEASURING DEVICE FOR A MONOPULSE TRACKING RADAR SYSTEM

BACKGROUND OF THE INVENTION

1. Field of the Invention

The present invention relates to tracking radar systems in general and more particularly to monopulse Doppler tracking systems adapted to ground object tracking with contemporaneous shell burst error determination.

2. Description of the Prior Art

The principle of the monopulse radar has been variously described in the technical literature. An article by R. M. Page, published in the "IRE National Convention Record" (Part 8, 1955, Page 132) is one such reference. Suffice it here to recall that such a radar is used for tracking a moving target in azimuth and/or in elevation, and that it is necessary, for each of these angular coordinates, to measure the magnitude and sense of the angular error between the axis of the antenna and the direction of the echo.

In an amplitude comparison monopulse radar, there are, for each angular coordinate, two primary sources or feeds (waveguide horns, for example) which simultaneously illuminate a single antenna aperture (a single reflector, for example) located physically in such a way that their radiation patterns overlap. The amplitudes of the signals received at the two primary feeds operating in a receiving mode are added respectively in phase and in phase opposition so that the sum and difference signals, S and D, thus obtained are in phase for an error of one sense and in phase opposition for an error of the opposite sense. These signals are amplified respectively in a "sum receiving channel" and in a "difference receiving channel". The resulting output signals are applied to a demodulator circuit (phase discriminator). This circuit carries out the operation D/S and delivers a signal having an amplitude substantially proportional (for small errors) to the angular magnitude of the error at a polarity which depends upon the sense of the error.

Moreover, when the monopulse radar is of the coherent type (pulse Doppler radar), there is performed, in each of the channels, a phase demodulation between the intermediate frequency signals and the coherent oscillator signal. The said coherent oscillator functions to "remember" the phase of the transmitted wave. The frequency of the video signals thus obtained contains velocity information which makes it possible to discriminate between moving and fixed targets.

In U.S. Pat. No. 3,230,526 (Patent 1,379,601 in France) a range selector is shown in a surveillance radar using a single receiving channel to eliminate fixed echoes while simultaneously observing several moving echoes of the same azimuth. The single channel of that radar could be, for example, the sum channel of a monopulse radar.

In a coherent monopulse radar, range selectors of the same type operating over the sum and difference signals received in a time interval delineated by a tracking gate enable determination of range and azimuth error signals characterizing the distance of the target with respect to the center of the gate. These signals are used for controlling the displacement of the gate and of the antenna "boresite" in such a way that the target is brought to the center of said gate. The manner in which this concept is uniquely applied in the present invention will be understood from the detailed description hereinafter.

Doppler filters such as employed in the selectors of the invention are described in Section 4.4 of "Introduction to Radar Systems", a textbook by M. T. Skolnick — 1962 Edition, published by McGraw Hill Book Co. New York, N.Y. Employment of these filters requires design of the passband in such a way as to cover the band of Doppler frequencies corresponding to the type of target which is tracked and to the wavelength of the transmitted signals.

SUMMARY OF THE INVENTION

At the outset of this description, certain terms and concepts mentioned hereinafter throughout this specification will be discussed.

The present invention, being mainly concerned with ground tracking and error measurement, involves somewhat different velocity and Doppler parameters than in the usual aircraft tracking MTI equipment. Thus, in a ground tracking radar operating at a wavelength of 3.18 cm, a slow target (pedestrian) filter would cover a typical Doppler band of 60 to 150 Hz and a filter for relatively fast targets (motor vehicles) would typically cover 120 to 1,880 Hz if the repetition frequency of the radar were $fr=3\,760$ Hz. These two types of filters will be referred to respectively as the low filter and high filter.

The error-measurement device according to the invention is associated with a tracking radar for measuring the error parameters (range and azimuth) between the tracked target (main or primary target) and a secondary target. The said secondary target could be, for example, the explosion of an artillery shell. This measurement of error parameters is carried out, without interrupting the continuous tracking under circumstances which will be apparent later in this specification.

The error-measurement device comprises, in particular, range selectors which process signals selected, by a tracking gate from sum and difference channels, and delivers range and azimuth error signals which localize the secondary target with respect to the center of said gate.

It has been empiracally confirmed that the Doppler frequency spectrum corresponding to the explosion of a shell on the ground extends over the whole band of the Doppler frequencies processed by the radar. Accordingly, observation of such an explosion is possible, using either high filters or low filters in the range selectors. In practice, the use of high filters presents a disadvantage, since the maximum radial speed of the fragments observable with such a filter is about 30 m/s (i.e., the echo expands radially by about 60 meters/second), this requiring a very high measurement rate if good accuracy is required.

In a preferred mode of exploitation of the error-measurement device according to the invention, low filters are used in the range selectors. Accordingly, a main fast target produces no observed echo in the band of Doppler frequencies processed by means of the range selectors and, moreover, the expansion speed of the echo is only about 10 meters per second. If an error measurement is carried out at one-second intervals over a secondary target located at 5 kilometers, the azimuth error is obtained with an accuracy of ± 10 m, and this can be made while tracking the main target. The measurement may also be carried out in the same way over a slow primary target because, in the case of a pedestrian, for instance, the apparent surface is much smaller than that of the explosion. It is, nevertheless, necessary to interrupt the tracking during the error measurement so that the radar should not lock onto the secondary target.

An object of the present invention is thus to incorporate into a coherent monopulse radar, a device for measuring range and azimuth errors for localizing a secondary target with respect to the main or primary target tracked by the radar.

Another object of the invention is to measure the error in range and in azimuth of the ground impact of a shell by using low Doppler filters (for slow targets) in the error measuring circuits so that the measurement rate is low.

A feature of the invention is that, in a monopulse coherent radar comprising circuits for performing ground surveillance as well as the acquisition and range and azimuth tracking of a primary target, there is used, a range error measurement device for secondary targets having a frequency spectrum extending all over the full range of Doppler frequencies processed in the radar. Also, each of the range tracking, azimuth tracking and error measuring circuits comprises range selectors which carry out the stroboscopic sampling of the video signals appearing within a tracking gate centered on the primary target. Still further, each of said selectors comprises two Doppler filters, called the low filter and the high filter, which may be selected according to the radial velocity and the apparent surface of the primary target; and said error measuring circuits deliver azimuth error signals respecting secondary target angle with respect to the center of the tracking gate. The range error signal is constituted by the video signal of the sum channel, and that, and the angle error signal are displayed on an error indicating cathode ray display.

Another feature of the invention is that, when the tracking circuits use high filters for the tracking a fast target of important apparent surface and the error measuring circuit uses low filters, the frequency spectrum of the Doppler signals originating from the primary and secondary targets are processed separately in the tracking circuit and in the error measuring circuit, so that both operations may be carried out contemporaneously during the time of observation of the secondary target.

Another feature of the invention is that, when the tracking circuits are using low filters for the tracking of a slow target and the error measuring circuit is using high filters, the frequency components of the Doppler signals originating from the targets are processed separately in the tracking circuit and in the error measuring circuit so that both operations may be carried out simultaneously if the primary target has a great apparent surface. Conversely, if said primary target has a small apparent surface, the Doppler components originating from the two targets are not processed separately and tracking is suspended during the time of observation of the secondary target.

Another characteristic of the invention is that, when the tracking and error measurement circuits both use low or high filters, the frequency components of the Doppler signals originating from the two targets are not processed separately in said circuits, and tracking is appropriately blocked during the time of observation of the secondary target.

The above mentioned and other features and objects of this invention will become apparent by reference to the following "Description of The Preferred Embodiment", taken in conjunction with the accompanying drawings.

The principle functional aspects of the invention as it concerns a coherent monopulse radar including range and azimuth error measuring devices may be listed and characterized as follows:

1. The signals received by the radar are processed, after coherent detection, in range selectors controlled by sampling strobe signals of frequency very slightly different from the repetition frequency of the radar. The stroboscopic sampling which results therefrom makes it possible to suppress fixed echoes having a frequency spectrum which is outside of the passband of the Doppler filters which equip the said selectors, without the use of the multiple range increment technique. This latter technique also requires multiple filters.

2. Each selector is equipped with two Doppler filters which may be switched according to the needs. The first one of these filters, or low filter, is assigned to the examination of targets moving at a slow radial speed and the second one, or high filter, is assigned to the examination of the targets moving at a relatively high radial speed.

3. In a surveillance mode, the sum channel signals are simultaneously applied to p range selectors receiving range strobe signals separated by TR/p. The term TR designates the duration of the repetition period of the radar so that p moving targets at the same azimuth may be simultaneously examined.

4. A telemetry strobe signal operates manually to mark a target selected for tracking, and a tracking gate framing said target is established from this strobe signal. In the tracking mode, the sum and difference signals appearing in this tracking gate are applied to the two groups of tracking selectors which deliver error signals to cause the said strobe signal to "track" the target signal and also to effect slewing of the antenna axis to maintain angular tracking.

5. For the measurement of the spacing or error between a secondary and a primary target, the sum and difference video signals appearing in the tracking gate are applied to the two error selectors controlled by error strobe signals. These selectors deliver azimuth error information and the sum channel signals constitute the range error information. These errors are measured with respect to the directivity axis of the antenna and with respect to the center of the tracking gate, respectively.

6. When the secondary target is the explosion of a shell on the ground which presents a frequency spectrum extending throughout the range of the Doppler frequencies covered by the low and high filters, either of these filters may be used for measuring the error.

7. When the tracking selectors use high filters for the tracking of a fast target of large apparent surface and the error selectors use low filters, the tracking is carried out normally during the whole time of observation of the secondary target.

BRIEF DESCRIPTION OF THE DRAWINGS

FIG. 7 depicts additional signal time relationships.

DESCRIPTION OF THE PREFERRED EMBODIMENTS

At the outset, it is desirable to review the operation of a range selector associated with a surveillance pulse radar of the coherent type. Such a selector is described in the aforementioned U.S. Pat. No. 3,230,526.

Figure 4:
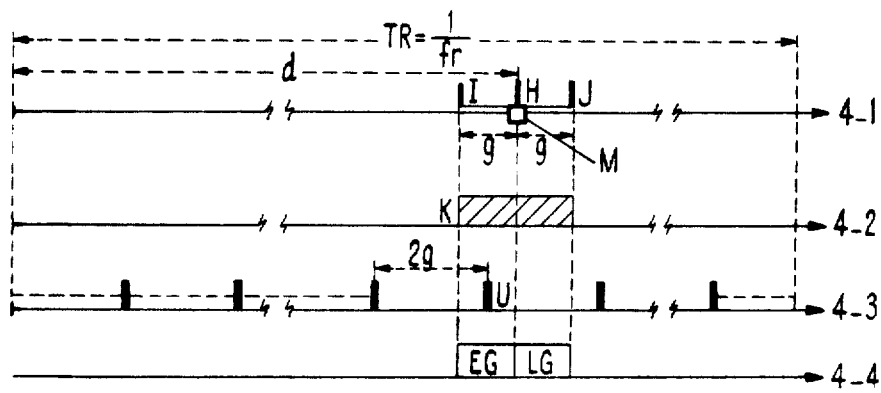
FIG. 4.1 to 4.3 are additional timing diagrams of certain signals of the system.

The high frequency and the intermediate frequency circuits of a coherent surveillance radar are shown on FIG. 4.5 of the Skolnick reference text (aforementioned) in which the coherent detection produces video pulses which are amplitude-modulated at the Doppler frequency $fe$ ($fd$ being equal to zero when a fixed echo is observed).

Figure 1:
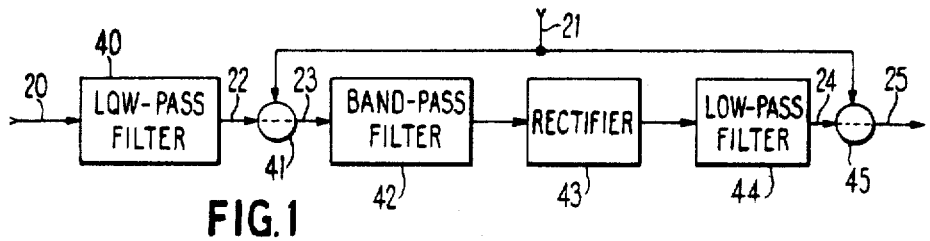
FIG. 1 is a block diagram of a range selector according to the invention.

FIG. 1 represents a range selector which comprises the input low-pass filter 40, the bandpass filter 42 or Doppler filter, the rectifier 43, the output low-pass filter 44 and the gate circuits 41 and 45. Gate 41 transmits, on its output 23, substantially the full amplitude of the signal applied on its input 22 when a control signal is applied to the input 21.

It will be recalled that, in a pulse coherent radar, the video signals corresponding to targets appear, at the repetition frequency $fr$, with a time delay, with respect to the synchronization (transmitter) pulse, which characterizes their distance (range). These signals may present a positive or a negative polarity during any one repetition period.

A fixed echo appears as a series of pulses of constant amplitude, whereas a moving echo appears as a series of pulses of variable amplitude from one repetition period to the next, the envelope of the signals received during the time of illumination of the target constituting the Doppler frequency $fd$.

The video pulses have a width TS which is very short compared to the duration TR of the radar repetition period delivered, and are applied to the input 20 of the low-pass filter 40. This filter selects the useful frequency spectrum of the signals at 20 and it will be assumed for the moment that its passband is limited to $fc = 1/TS$.

The output signals 22 of this filter are applied to the electronic gate 41 which is controlled by strobe signals applied to the control input 21. These signals are pulses of duration TC < TS and of repetition frequency $fr - \epsilon$, $\epsilon$ being extremely small with respect to $fr$. Several means are known for generating such signals, one of these means being described in French Pat. No. 1,388,840.

The signals 23 delivered by this gate are applied to the Doppler (band-pass) filter 42, having a passband which covers the Doppler frequencies corresponding to the range of velocities possible for particular observed targets. This filter thus eliminates fixed echoes as well as moving echoes of velocities outside this range.

The signals delivered by filter 42 are then rectified by the rectifier 43 and averaged by the low-pass filter 44. The output signals 24 of this filter are then sampled in the gate 45 by the same strobe signals as controlled gate 41. The signals appearing at the output 25 are constant amplitude pulses which correspond to the observed moving targets and the time position of said pulses characterizes target range.

Figure 2:
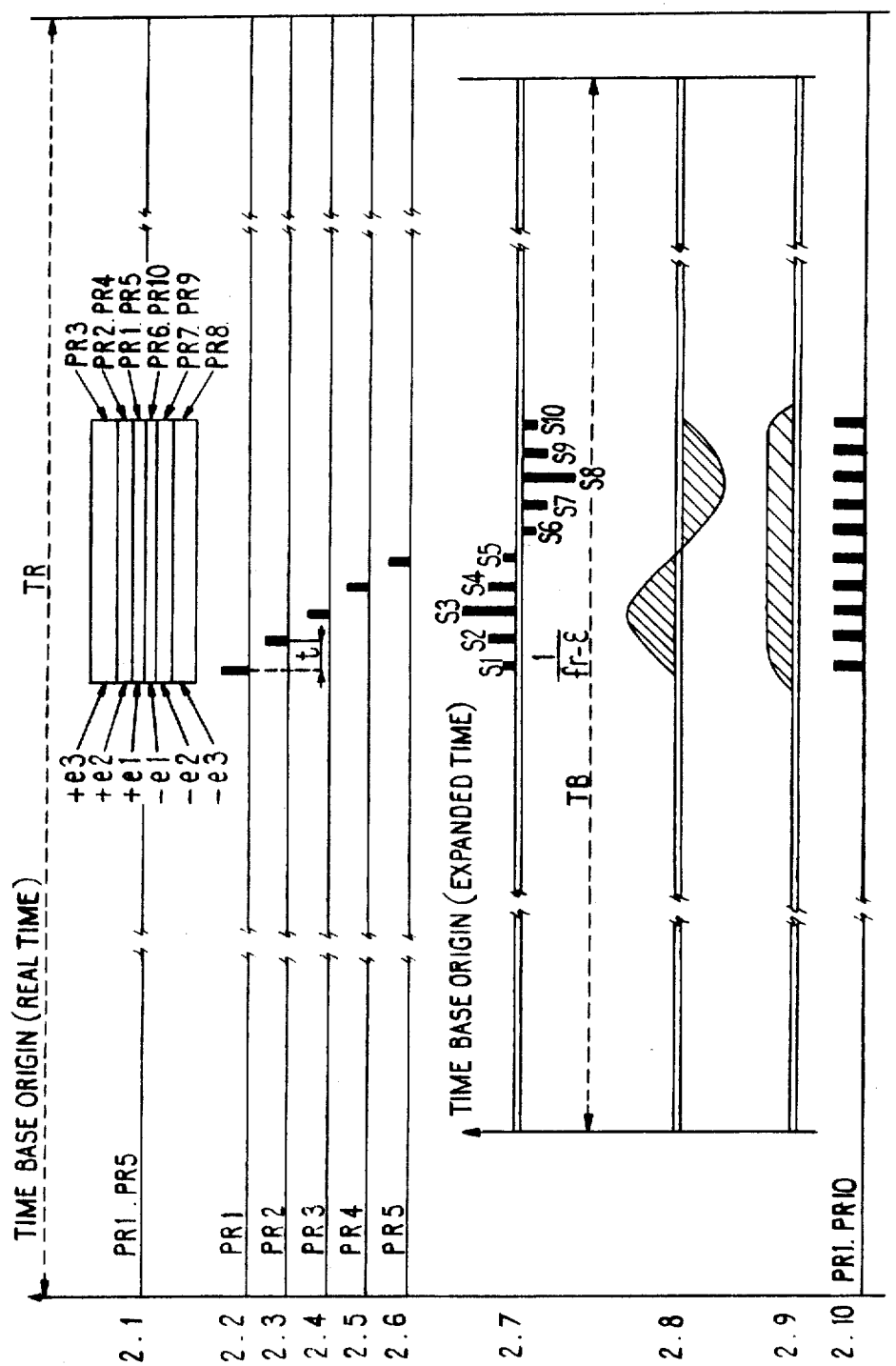
FIGS. 2.1 to 2.10 depict waveforms and time relationships of signals which are present in the selector of FIG. 1.

Referring now to FIG. 2.1, a schematic representation of a moving echo presented on a type A display will be explained. The observation concerns one period of a signal having a Doppler frequency $fd = fr/10$, which is sampled, by the strobe signals over ten successive repetitive periods $PR_1$ to $PR_{10}$. During this time interval the amplitude of the hypothetical echo successively assumes the positive values $e_1, e_2, e_3, e_2$, and $e_1$, followed by the same negative values.

In order to simplify the description, the video signals have been illustrated in rectangular form and of exaggerated duration with respect to the strobe signals. Actually, these signals have less regular shapes and are not more than two to three times wider than the strobe signals. The effect of these limitations will be examined at the end of the description.

In FIGS. 2.2 to 2.6, the time positions of a strobe signal during the repetition periods $PR_1$ to $PR_5$ are shown. The frequency $\epsilon$ being very small (typically $\epsilon = 1$ Hz for $fr = 3,760$ Hz), the repetition frequencies of the radar synchronization (transmitter) signal and the strobe signal differ only slightly, and accordingly, the strobe sampling pulse "drifts" by a small amount of time $t$ from one repetition period to the next. This fact is graphically presented in FIGS. 2.2 to 2.6. In order to simplify the figure, only the strobe signals of periods $PR_1$ to $PR_5$ are shown, the time positions of $PR_6$ through $PR_{10}$ being easily adduced.

In a well known manner, the strobe signal 21, of repetition frequency very slightly different from that of the video signals, controls a stroboscopic sampling of said video signals via gate 41.

Thus a train of amplitude modulated pulses having an envelope which is that of the video signals but which is expanded in time by a factor $m = fr/\epsilon$ is produced, in the spectrum of these signals, if the spectral components which are at and over the sampling frequency are suppressed, the result is a signal having a frequency spectrum reduced by a ratio m with respect to that of the sampled signals.

The signals obtained by means of this operation and appearing on the output 23 of the gate 41 have been typically shown at FIG. 2.7 under the references S1 to S10. They have been shown on a time scale referenced TB which is the reciprocal of the beat frequency of signals of frequency $fr$ and $fr - \epsilon$. The beginning of this period TB corresponds to the time when the strobe signal is coincident with a synchronization pulse of the radar.

It may be said that this representation is made on an expanded time base or scale.

When the radial speed of the observed target is zero (fixed target, $fd = 0$) the signals obtained by the sampling are all of the same polarity (positive or negative) and have constant amplitude. Their envelope is thus a rectangular signal and, since the frequency spectrum of the signals 22 is limited to $fc$ by the video filter 40, the spectrum of the expanded signal 23 is limited to $(fc)$ $(\epsilon/fr)$.

In the case of a moving target, it is seen that the envelope of the signal 23 shown on the diagram 2.7 (FIG. 2) is at the Doppler frequency $fd$. It may be shown that this signal is parasitically modulated due to the sampling so that, for each component of the Doppler frequency, there are associated components at $\pm n \epsilon$. This parasitic modulation does not present any problem since, in the radar described, there is no processing of the Doppler information for measuring the absolute velocity.

The signal 23 is applied to the Doppler filter 42 which is, in practice, a passband filter of low cut-off frequency $fo > (fc)(\epsilon/fr)$ and of high cut-off frequency $fr/2$. The first of these cut-off frequencies is chosen to eliminate the Doppler components from slightly moving echoes such as trees agitated by the wind (clutter echoes). The second cut-off choice eliminates the components $nfr$ of the signals represented in FIG. 2.7.

As it has been seen during the study of FIG. 1, the output signals of the filter 42 are detected linearly by the circuit 43 and averaged by the low-pass filter 44.

If the circuit 43 is a full-wave rectifier, the cut-off frequency of the low-pass filter is chosen lower than twice the low cut-off frequency $fo$ of the filter 42.

The output signal 24 of the low-pass filter 44, which appears continuously when the strobe signal 21 scans the moving target, is represented on FIG. 2.9. By way of partial summary, it will be noted that:

a. the expanded time scale covers the beat period TB, and that the output signals 24 of the selector occupy, on this scale, the same relative position as the echo received in real time;

b. the signal 24 does not contain any information about the target velocity; and c. the amplitude of this signal is proportional to that of the signal received by the radar.

The expansion of the time scale by a ratio m may be interpreted by saying that stroboscopic sampling produces, at the output of the filter 44, signals which are identical to those which would be obtained by means of a radar operating in a medium with a wave propagation speed of $c \, \epsilon/fr$. The displacement speed VR of the strobe signal is easily adduced from this, as follows:

$$VR = c/2 \cdot \epsilon/fr \quad (1)$$

($c$ being the speed of light).

In order to obtain output signals in real time, the signals 24 are applied to a range restitution circuit constituted by the gate 45. This gate is controlled by the same strobe signals as those used in the stroboscopic sampling (FIGS. 2.2 to 2.6, FIG. 2). Since a strobe signal appears only once at each repetition period $PR_1$ to $PR_{10}$, one obtains an output signal 25 only when said strobe, which gives the range information, coincides with an expanded signal such as represented on FIG. 2.9. The signals 25 appear thus in real time, delayed with respect to the synchronization signal, by amounts corresponding to their distance. These signals are shown on FIG. 2.10, as they would appear on an A scope display.

As has been mentioned hereabove, the video signals 20 actually have rounded edges and their width is actually of the same order as that of the strobe signals. This results in a slight amplitude distortion and a pulse-width modulation of the signals S1 to S10 (FIG. 2.7) both of which are substantially eliminated by the filters 42 to 44.

Before proceeding to describe the utilization and operation of the selectors in the range and azimuth error measurement device according to the invention, it is desirable to define the main characteristics of the coherent monopulse radar with which the device of the invention is associated.

The high frequency, intermediate frequency and coherent detection circuits of such a radar have been described in the U.S. Pat. application Ser. No. 15,687 filed Mar. 2, 1970. The assignee of that application is the same as of the present case.

If the repetition period of this radar is $TR = 0.266$ milliseconds ($fr = 3760$ Hz), its theoretical maximum range is $Ru = 40$ kilometers. In one practical instrumentation, half of this period, i.e., 0,133 ms, is reserved for the transmission, through the HF and IF circuits, of a calibration signal used for effecting gain and phase shift equalization in these circuits. Accordingly, the maximum useable range of the radar is limited to 20 kilometers. The passband of the Doppler filters associated with the selectors hereinafter described is limited to $fr/2 = 1,880$ Hz so that the radar may detect, without any velocity ambiguity, moving targets having a velocity lower than: $Vm = [(fd) \lambda/2] = 30$ m/s (108 km/h), in view of the chosen transmission wavelength $\lambda = 3.18$ cm.

This radar presents three modes of operation, as follows:

Mode 1 is for surveillance and acquisition.

Mode 2 is for automatic tracking and rough range measurement.

Mode 3 is for automatic tracking and refined range measurement.

In these different modes, and according to the anticipated functions, it is possible to choose among several types of range selectors controlled by range strobe signals having different characteristics. These different combinations are grouped in Table 1 and will be now described in relation to FIGS. 3 and 4.

Figure 3:
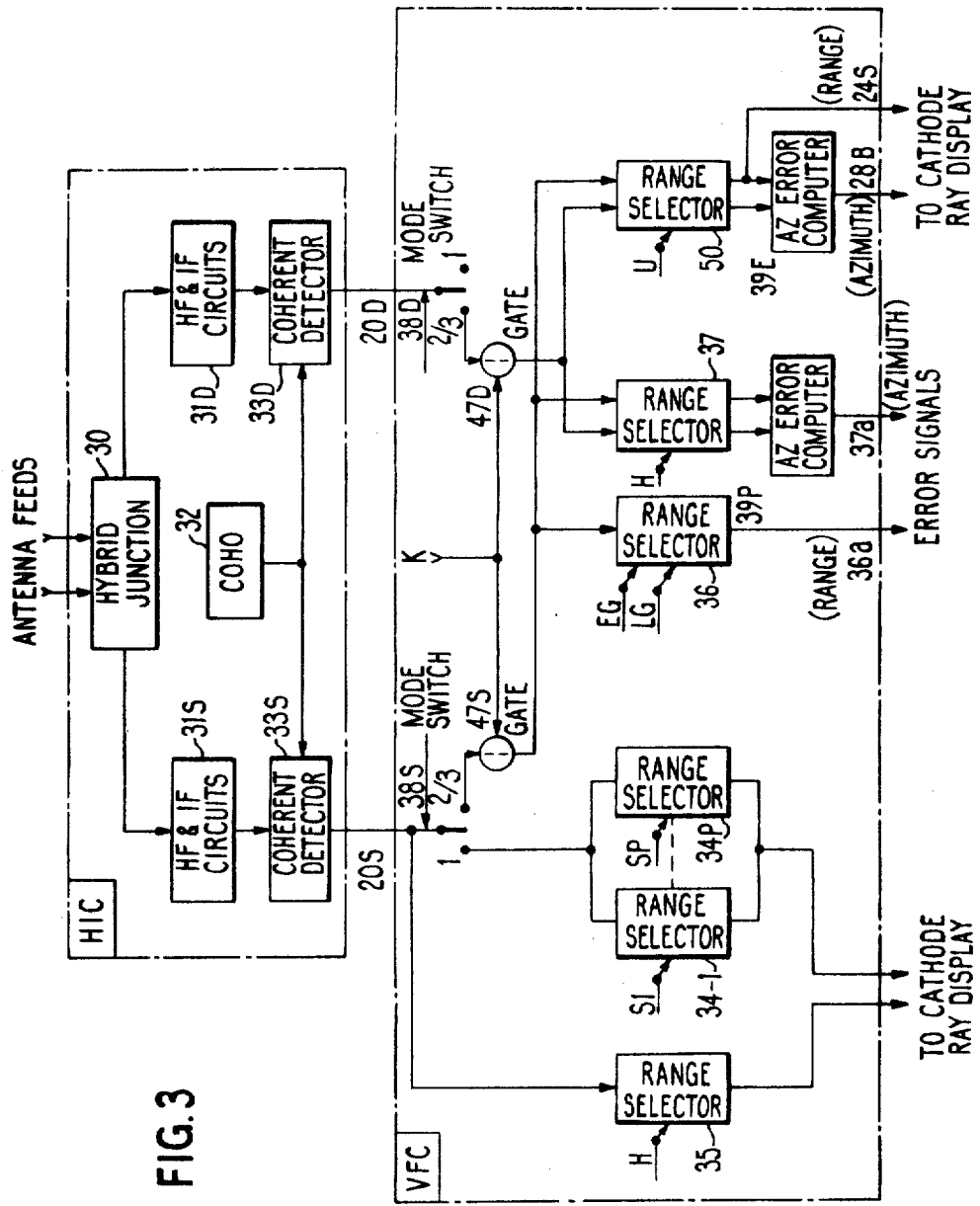
FIG. 3 represents, in a block diagram form, the circuits of a coherent monopulse radar.

FIG. 3 represents the block diagram of the HF and IF circuits referenced HIC and of the video frequency circuits referenced VFC.

The circuit HIC has been described in French Patent Application PV 949 441 (aforementioned) although the gain and equalization circuits described in detail in that patent application have been omitted from FIG. 3 for simplification. The circuit HIC comprises the hybrid junction 30 receiving the antenna signals and delivering the sum and difference signals to the HF and IF circuits of the sum and difference channels referenced respectively 31S and 31D. The output signals of these amplifiers are applied respectively to the coherent detectors 33S and 33D, the detection being carried out by phase comparison between these signals and those delivered by the coho (coherent oscillator) 32.

The video signals 20S and 20D delivered by the circuit HIC are applied to the mode switches 38S and 38D having positions 1 and 2/3 corresponding respectively to the mode 1 and to the modes 2 and 3. This circuit VFC comprises also the electronic gates 47S and 47D and the range selectors 34-1 to 34P, 35, 36, 37 and 50.

In the mode 1, the sum video signals 20S are applied to a group of p selectors according to FIG. 1 or surveillance selectors (Table 1, line 1). These selectors, referenced 34-1 to 34-p on FIG. 3, are controlled by p surveillance strobe signals S1 to Sp which are dephased by TR/2p so that they facilitate analysis and display, simultaneously, of p different moving echoes on a type-B scope.

These range signals are obtained from synchronization signals appropriately delayed.

coincidence with the echo M during the acquisition, is shown. The pulses I and J have been generated from this signal and define the beginning and the end of the tracking gate K shown on the diagram 4.2. An instrumentation suitable for generation of these various signals will be described further on, in relation to FIGS. 6 and 7.

The sum and difference video signals selected by the gates 47S and 47D are applied first to two groups of selectors which will be called respectively range tracking selectors (referenced 36 on FIG. 3) and azimuth tracking selectors (referenced 37 on FIG. 3); each of these groups comprising two selectors.

The range error information is obtained according to the well known process described in section 5-6, pages 189 to 190, of the Skolnick reference (aforementioned). strobe through a In this process, an early gate EG and a late gate LG are used, generated, for instance, from the tracking gate K (see FIG. 4.4). The gates EG and LG are used as control signals in the range tracking selectors (Table I, line 3). The tracked signals are compared with the said EG and LG gates to produce a signal characterizing (in amplitude and in sign) the error between the position of the target and that of the range strobe signal H (FIG. 4.1). This signal, which appears at the output 36a controls the position of this strobe through mechanical servo link to effect tracking by error cancellation.

It is thus seen that the displacement (range) of the strobe signal H is controlled either manually (surveil-

TABLE I

| Lines | Operation modes | Performed functions | Range selectors | | |
|---|---|---|---|---|---|
| | | | Number and designation | Input signals | Strobe signals |
| 1 | Mode 1 | Surveillance and acquisition | p surveillance selectors | Sum channel | Surveillance strobe signals. |
| 2 | | do | 1 target selector | do | Range strobe signal. |
| 3 | Modes 2 and 3 | Tracking | 2 range tracking selectors | Sum and difference channels | Early and late gate signals. |
| 4 | | do | 2 azimuth tracking selectors | do | Range strobe signal. |
| 5 | | Error measuring circuit | 2 azimuth error selectors | do | Error strobe signals. |

The signals 20S are also applied to the telemetry selector 35 (Table I, line 2) controlled by a range strobe signal H which, in this mode 1, is manually controlled. The position of this range strobe is given by a digital display device coupled to the operation control, and also by a telemetry index appearing on the screen of the cathode ray display at the marked distance. For acquisition, an operator brings this index into display coincidence with the image of the target to be tracked. Thereafter, the switches 38S and 38D are set in position 2/3.

In order to perform the tracking in the modes 2 and 3, a tracking gate signal K is generated on both sides of the range strobe H, this signal K being used for activating the electronic gates 47S and 47D, so that only the video signals appearing within this gate are applied to the groups of selectors 36, 37 and 50.

FIGS. 4.1 to 4.4 show the time relationships of signals involved in these operations.

On FIG. 4.1, one repetition period of the radar of duration $TR = 1/fr$ and a moving echo M (symbolized by a subscript square) at a distance d from the radar are shown. The range strobe signal H, brought manually in lance or acquisition) or automatically (tracking). The mode of achievement of this control will be described in relation with FIG. 8.

The two azimuth tracking selectors (Table I, line 4) which are controlled by the strobe signal H, deliver signals, the amplitudes of which are proportional to those of the signals processed in the sum and difference channels. These signals are applied to an azimuth error computer 39P (FIG. 3) which calculates, either the product of their amplitudes as described in the Skolnick reference (Page 179) or their ratio (as described in the review "IRE Transactions on Military Electronics" — April 1962 issue — Page 149 and FIG. 7a). In this last process, the ratio is generally obtained by normalizing the sum and difference signals by an automatic gain control circuit, a process which suffers from a relatively long response time constant. In the present invention, the method described in French Pat. No. 1,216,517 is considered preferable. In this method, the two signals are modulated separately by an auxiliary high frequency signal, then the resulting signals are added algebrically after the modulated signal of the difference channel has been shifted by 90°.

Finally, a phase comparison is made between the signal obtained by the addition and the signal delivered by the sum channel. These operations produce the azimuth error signal which appears on the output 37a in magnitude and sign suitable for servo control to correct the position of the antenna.

The signals delivered by the electronic gates 47S and 47D (FIG. 3) are also applied to error selectors grouped under the reference 50 (see Table I, line 5). These selectors are controlled by the error strobe signals U and their output sum and difference signals are applied to the azimuth error computer 39E (identical with the computer 39P) which delivers an output signal at 28B characterizing the azimuth error of a secondary target with respect to the main target previously acquired and tracked. The sum channel signals give the range error directly, on the sum output 24S.

If only one strobe signal U appears during a repetition period, the frequency of said strobe signals is $(fr - \epsilon)$. In actual fact, the repetition frequency of said strobes is a multiple of $(fr - \epsilon)$ so chosen that, when a strobe coincides with the signal J, the next strobe coincides with the signal I. This will be understood from FIGS. 4.2 and 4.3. In this way, the tracking gate is continuously scanned by a single strobe signal U.

If the error selectors are equipped with low-pass filters and the tracking selectors are equipped with high-pass filters (fast primary target), a secondary target having the characteristics of a slow target will not deliver sufficient signal to the tracking selectors to capture the tracker. The aerial will remain directed toward the primary target and the signals delivered by the error selectors may be used to measure the error between the main and the secondary target.

In the device according to the invention, the error display is made, on an expanded time scale type-B cathode ray display, which is different from that used for surveillance and acquisition.

The horizontal scanning of this display must be such that the duration of the scanning of the useful surface of the screen is equal to the time of analysis of the tracking gate by an error strobe signal. A mode of achievement of such scanning will be described later in this specification in relation with FIG. 9 and FIG. 10.

Figure 5:
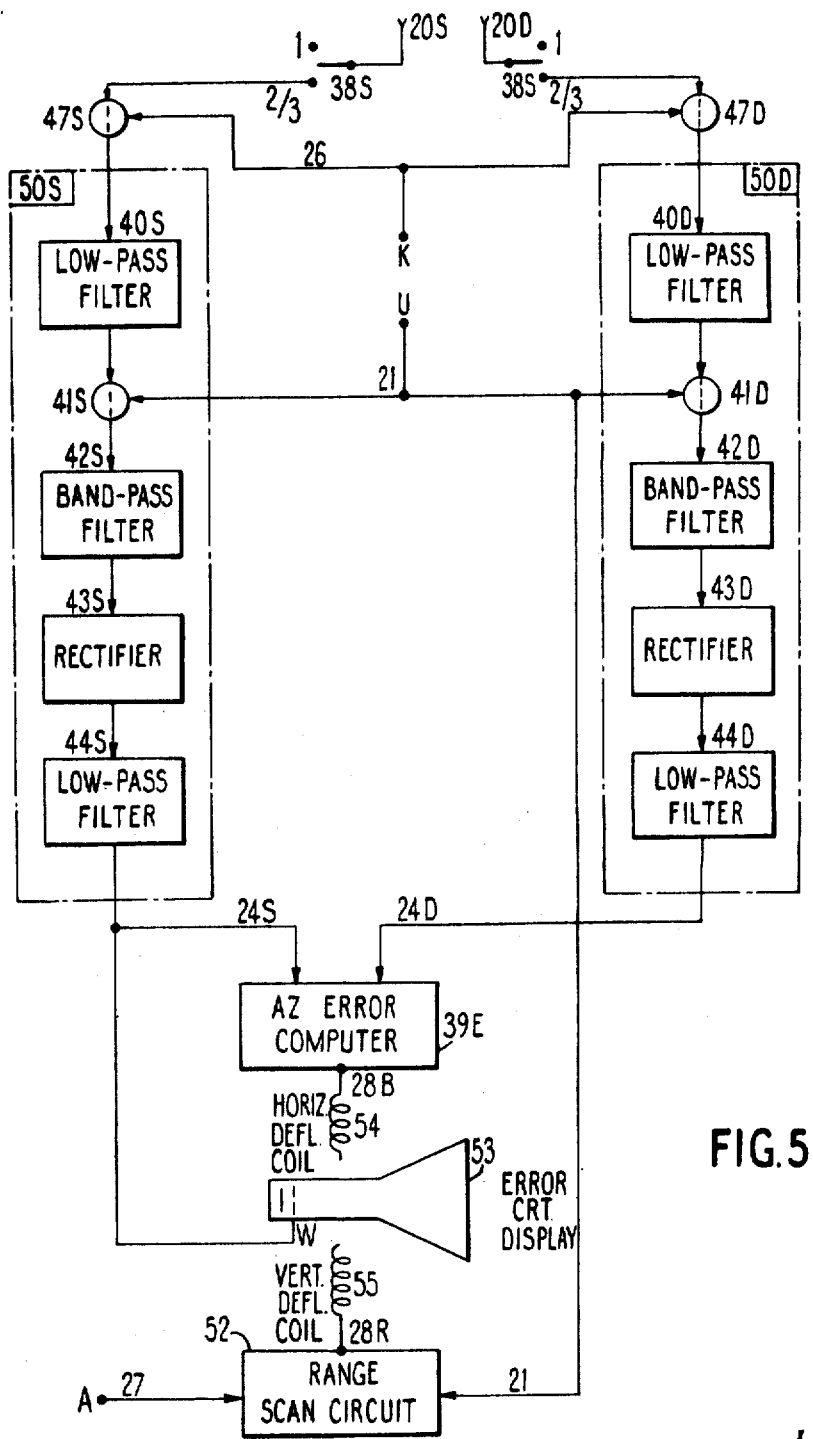
FIG. 5 is a block diagram of circuits constituting the error measuring device according to the invention.

FIG. 5 represents circuits constituting the error measuring device according to the invention. The sum and difference video processing channels, respectively referenced 50S and 50D, are essentially identical. The azimuth error computer is 39E; the range scanning circuit 52 and the error CRT display 53, with its horizontal and vertical scanning circuits referenced 54 and 55.

The control signals of this error measuring circuit are the signals K (tracking gate), U (error strobe signal) and A (train of pulses having a repetition period, in mode 2, of 6.6 μs, corresponding to one kilometer on the ground). The generation of these signals will be described in detail in relation with FIGS. 6 and 7.

The sum channel 50S comprises the elements 40S, 41S, 42S, 43S, 44S which are identical to those described in relation with FIG. 1 and which bears the same numerical references followed by the letter "S." The strobe signals U are applied to the input 21 of the electronic gate 41S.

The difference channel 50D comprises the same elements which bear the same numeric references followed by the letter D.

The video signals in expanded time scale appearing on the outputs 24S and 24D of the channels 50S and 50D are applied to the azimuth error computer 39E. The output signal 28B of said computer, which represents the azimuth error in sign and magnitude, is applied to the horizontal deflection coil 54, it being assumed that appropriate impedance matching and power gain are included.

The signals 24S delivered by the sum signal processing channel 50S are applied to the intensity controlling electrode W of the cathode ray tube 53, so that spot illumination is effected by the presence of an echo signal. Finally, the vertical deflection coil of the tube 53 is controlled by the range scanning circuit 52 at 28R. It will be recalled that this scan, controlled by the signals U and A applied to the inputs 21 and 27 of the circuit, is carried out in expanded time.

In relation with FIGS. 6 to 9, the circuits which deliver the telemetry and error measurement signals previously mentioned, may now be discussed.

Figure 6:
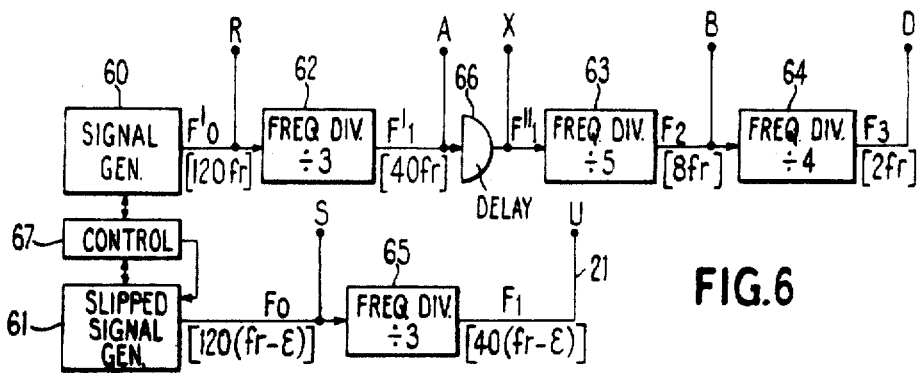
FIG. 6 presents a block diagram of the logic of circuits delivering the clock signals used in the telemetry and space measuring circuits.

FIG. 6 depicts the elements of the clock unit, comprising the main signal generator 60, the slipped signals generator 61, the frequency dividers 62 to 65, the delay circuit 66 and the circuit 67 which controls the frequency slipping 67.

The generators 60 and 61 deliver pulses of very low duty factor which have repetition frequencies $F'o = 120\,fr$ and $Fo = 120\,(fr - \epsilon)$, $\epsilon$ being very small with respect to fr. a circuit for obtaining such signals is described in French Pat. 1,388,840 (aforementioned).

The control circuit 67 delivers a signal representing, in magnitude and in sign, the beat frequency between the applied signals. That signal is compared to a reference signal characterizing the nominal difference of frequency $\epsilon$ and the resulting error signal is applied to the generator 61 wherein it modifies the frequency in such a way as to cancel said error.

The dividers 62, 63, 64 and 65 produce frequency divisions in the ratios 3, 5, 4, 3 respectively and the circuit 66 provides a phase shift of $(2\pi - \Psi)$ so that the signals defined in Table II appear at the various output terminals as listed.

TABLE II

| Output terminal | Frequency | Remarks |
|---|---|---|
| R | $F'o = 120\,fr$ | |
| A | $F'1 = 40\,fr$ | |
| X | $F''1 = 40\,fr$ | Signal leading by $\Psi$ with respect to the signal A |
| B | $F2 = 8\,fr$ | |
| D | $F3 = 2\,fr$ | Signal obtained from the signal X |
| S | $Fo = 120\,(fr - \epsilon)$ | |
| U | $F1 = 40\,(fr - \epsilon)$ | |

FIG. 7 presents timing diagrams for signals X, A, B and D, which have been represented respectively on the lines 7X, 7A, 7B and 7D.

Figure 8:
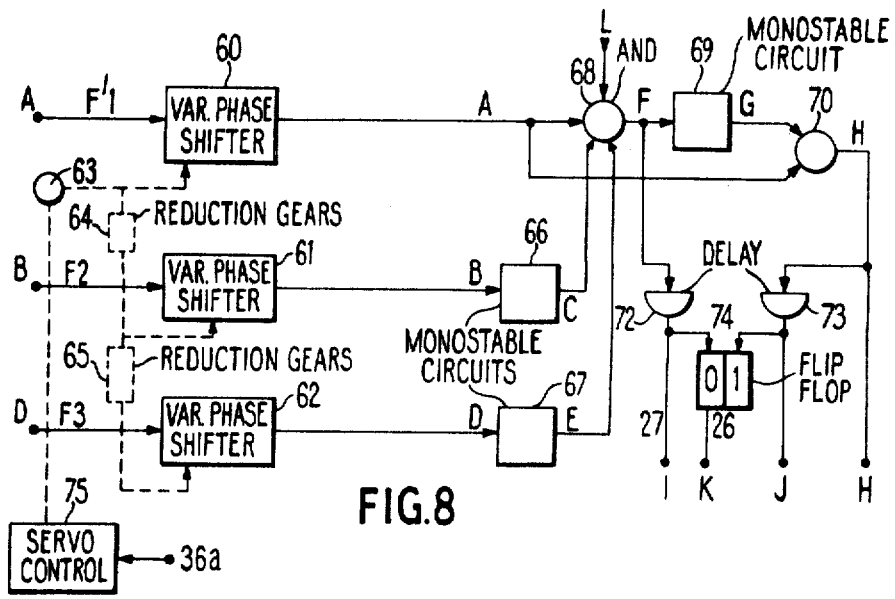
FIG. 8 shows the circuits for generating the telemetry signals.

FIG. 8 shows the circuit arrangement for producing the telemetry signals. It comprises three inputs to which are applied the signals A, B and D, defined in Table II. These signals are applied respectively to the variable phase shifters 60, 61, 62 controlled mechanically by means of the operation knob 63 of the digital display device previously mentioned (also referred to as the telemetry knob).

As it has been seen above, during the study of FIG. 3, this knob may be controlled either manually (for surveillance or acquisition) or automatically (for tracking). In the latter case, the range error signal 36a acts on the mechanical (servo) control unit 75 which includes a reversible motor mechanically coupled to the knob 63.

The phase shifter 60 is directly controlled by this knob in such a way that a full travel varies phase shift 360° (of the signal $F'l = 40 fr$.) In a radar having a range $Ru = 40$ km, the pulses of the signal F'l are separated by 6.6 $\mu s$ (6.6$\mu s$ = $l$ km). A one-turn rotation of the knob 63 produces thus a shift of each of the pulses of the signal A (FIG. 7, line 7A) corresponding to a displacement of 1 kilometer on the ground.

The phase shifters 61 and 62 are controlled through the reduction gears 64 and 65 in such a way that the phase angle of 360° corresponds to displacements of 5 kilometers and of 20 kilometers, respectively, for the pulses B and D (lines 7B and 7D, FIG. 7). These signals B and D are applied to the monostable circuits 66 and 67 which deliver signals C and E (lines 7C and 7E, FIG. 7) having durations of 6.6$\mu s$ (1 km) and of 30.7$\mu s$ (4.5 km), respectively.

It has been seen previously that only half of the repetition period TR is used for the reception of the signals. This fraction of the period TR is defined by a measurement signal L represented on the FIG. 7, line 7L.

The signals A, C, E and L are applied to the control inputs of the "AND circuit" referenced 68 which delivers a pulse F (line 7F, FIG. 7) taken from the train of signals F'1 (line 7A, FIG. 7).

When one operates the knob 63, the signals A, C and E move simultaneously and, more precisely, each of them moves — in the direction of increasing delays - by 6.6$\mu s$ (1 km) per revolution of the telemetry knob.

Each signal C (line 7C, FIG. 7), the duration of which is equal to one repetion period of the signal A (line 7A, FIG. 7) and which leads the A signal by an angle $\Psi$, can overlap only one signal A. Similarly, each signal E (line 7E, FIG. 7) covers only one signal C so that the gate 68 delivers (during one repetion period of the radar) only one signal F moving by 6.6$\mu s$ (1 km) per revolution of the telemetry knob. It is noted that there would be a second signal delayed by TR/2 with respect to this signal if the AND circuit 68 was not appropriately gated by the measurement signal L.

The signal F controls the monostable 69 delivering a signal G (line 7G, FIG. 7) of duration 10$\mu s$ (1.5 km) which is applied, at the same time as the train of signals A, to the AND circuit 70. It is seen, on the line 7H (FIG. 7), that the output signal H of this circuit is the pulse which immediately follows the signal F (line 7F, FIG. 7). This pulse H constitutes the range strobe signal.

The signals F and H are applied to the circuits 72 and 73 which delay them, in mode 2 by 3.3$\mu s$ (0.5 km) so that the resulting signals I and J (line 71–J, FIG. 7) are, respectively, leading and logging by 3.3$\mu s$ with respect to the strobe signal H. In mode 3, these circuits produce time delays of 5.5 and 1.1$\mu s$ respectively, so that the resulting signals are located at 1.1$\mu s$ (165 m) on either sides of the strobe signals H.

Finally, the signals I and J are applied to the two inputs of a flip-flop 74 (FIG. 8) which delivers the tracking gate signal K on its output "O" (line 7K, FIG. 7; FIG. 4.2). Substantially centered within that gate signal K, lies the strobe signal. The duration of the gate K is 6.6$\mu s$ (1 km) in mode 2 and 2.2$\mu s$ (330 m) in mode 3.

The manner of generating the error strobe signal which has been designated by U in FIG. 4.3 will now be described. By way of example, it will be assumed that an error strobe analyses the tracking gate K in 1 second (i.e., 3 760 TR).

For operation in mode 2, these strobe signals are obtained from signals of frequency $Fl = 40 (fr - \epsilon)$ as defined by the FIG. 6 and in the Table II. With strobes spaced approximately 6.6$\mu s$, one of them can complete the analysis of the gate and reside in coincidence with the signal J (FIG. 71 J) while the next strobe signal is coming in coincidence with the signal I thus assuring continuous strobing of the gate.

Figure 9:
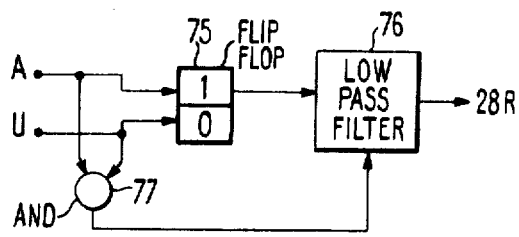
FIG. 9 shows the detailed range scanning circuit of the range error cathode ray display.

For operation in mode 3, these strobe signals are obtained from the signals Fo (FIG. 6 and Table II) and they will be designated by S. For the sake of completeness, a circuit which may be used for scanning in the range measurement cathode ray display is depicted at FIG. 9. This circuit produces a repetitive scanning of the tracking gate in a time equal to the time of analysis of said gate by an error strobe signal. It comprises the flip-flop 75, the low-pass filter 76 and the AND circuit 77. In mode 2, the input signals are the very narrow signals A and U (FIG. 6 and Table II) which are applied respectively to the inputs 1 and 0 of the flip-flop. As is well known, this latter effectively constitutes a linear phase detector delivering signals characterizing the phase angle between signals A and U. The low-pass filter 76 converts these signals into a ramp signal appearing on the output 28R, the repetition frequency of which is equal to the beat frequency of the applied signals. The cut-off frequency of said filter 76 is chosen to be higher than said beat frequency.

The beat period is defined by the time interval separating two successive coincidences of the signals A and U, this time being equal to the scanning time of the tracking gate by an error strobe signal U. The signals A and U are, moreover, applied to the AND circuit 77 which delivers a signal which resets to zero the ramp signal when A and U coincide. It will be seen then that the scanning duration is effectively equal to the time of analysis of the tracking gate.

Figure 10:
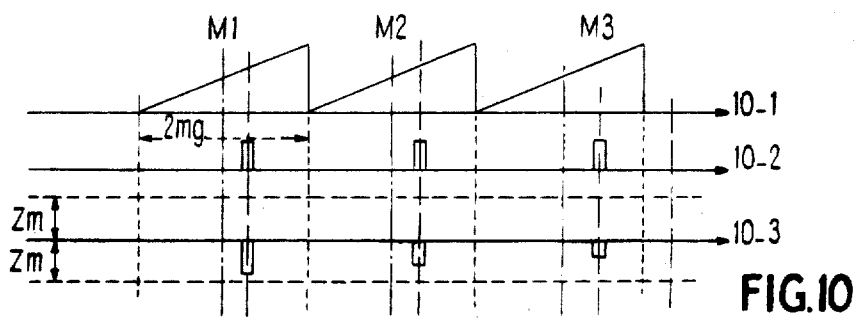
FIG. 10 represents the spectrum of frequencies corresponding to an explosion of a shell on the ground.

FIGS. 10.1 to 10.3 illustrate the relationships just described. FIG. 10.1 represents the time corresponding to the passage of three successive error strobe signals over the tracking gate, the duration of each ramp being equal to $m$ times the duration of the gate, i.e., 2 mg (see FIG. 4.2). The vertical lines M1, M2, M3 represent the position of the primary target which is centered in the tracking gate.

The FIG. 10.2 represents the sum channel signals 50S (FIG. 5) which are applied directly to the intensity control electrode W of the tube 53 over the conductor 24S.

If only the horizontal scanning signal 28R and the signals 24R are applied to modulate the intensity control electrode, a spot would appear in the center of the screen characterizing the range error of the secondary target with respect to the main target.

FIG. 10.3 represents the signals delivered by the azimuth error computer 39E (FIGS. 3 and 5) to measure a maximum error of amplitude ± $Zm$. These signals, applied to the input 28R of the cathode ray tube, control the vertical scanning, so that the spot assumes a position characterizing the azimuth as well as the range error.

The mode of exploitation of the error measurement device described in relation with FIG. 5 may now be examined. As has been mentioned previously, the error selectors are each equipped with a high Doppler filter and with a low Doppler filter which can be switched according to the characteristics of the primary and secondary targets. These filters are identical to those used for tracking. Their high cutoff frequency is determined by the maximum speed of the primary target and it is limited to 150 Hz (2.25 m/s) for the low filters and to $fr/2 = 1\,880$ Hz (30 m/s) for the high filters.

The low cut-off frequency $fo$, which has been mentioned during the study of FIG. 1, depends on several factors discussed below. In this context, the word "clutter" designates unwanted information which may appear on the display. These factors are enumerated as follows:

a. Presence of clutter due to the fluctuations of fixed echoes; measured in one particular case of a small hill covered by trees, at 30 Hz.

b. Clutter generated by the process of stroboscopic sampling of the video signals. It has been seen, during the study of this operation, that the frequency spectrum of the signals was reduced, by the sampling, in the ratio $\epsilon/fr$. The video filter 40 (FIG. 1) delivering signals having a frequency spectrum limited to $fc$, the frequency spectrum of the signals applied to the Doppler filter 42 (FIG. 1) is limited to $(fc).(\epsilon/fr)$ and accordingly $(fc)(\epsilon/fr) < fo$, must be true.

c. Clutter due, in mode 1 (surveillance), to the rotation of the antenna (scan modulation). The transmitted signals scan the target in a way functionally similar to the scanning of the video signals by the strobe signals. This produces a parasitic frequency spectrum which has to be taken into account.

These three clutter sources introduce parasitic frequency spectra which are difficult to calculate. It may be observed, however, that clutter due to stroboscopic sampling has a spectrum which widens when the signals (video and strobe signals) are narrower and the displacement speed of the strobe signals $[VR = (c/2)(\epsilon/fr)]$ is higher. The duration of the video and strobe signals determines, as it will be seen further on, the precision of the error measurement and the displacement speed of the strobe signals is determined by the rate of the error measurement and by the width of the tracking gate.

Table III (following) indicates, by way of examples, the ranges of the target speeds covered by the Doppler filters (columns 1, 2,3). This Table gives also (column 6) the displacement speeds of the strobe signals which have been chosen in modes 2 and 3 (column 4) as well as the values of the cut-off frequency fc of the video filter (column 5).

Figure 11:
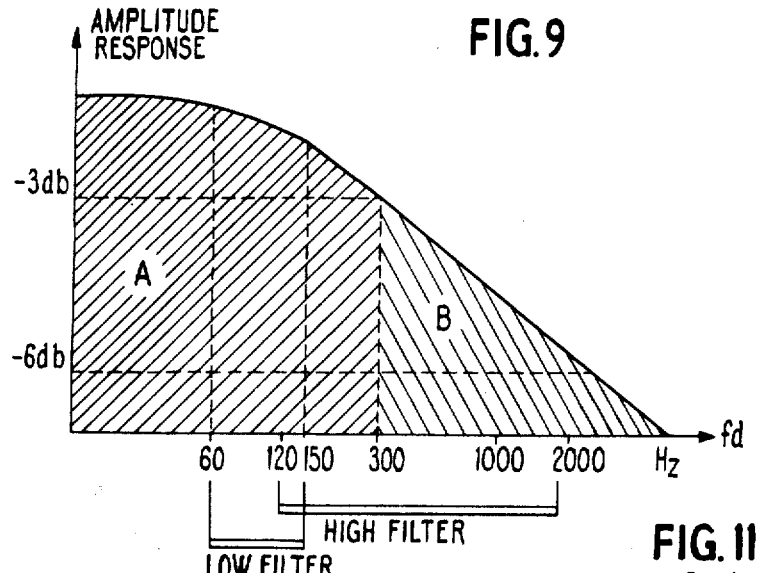
FIG. 11 is a response curve representation for high and low filters.

FIG. 11 represents the envelope of the frequency spectrum corresponding to a shell explosion on the ground. It is seen that this spectrum extends over the whole range of frequencies covered by the low and high Doppler filters, so that it may be processed by either of said filters. Further on, in relation with Table III, the four different types of error measurement which can be defined by the various combinations of filters in the tracking selectors and the error measuring selectors will be discussed, but it will be noted now, that the best results are obtained by using low filters in the error selectors. In fact, one can see, on FIG. 11, that the different components of the spectrum of the explosion have practically the same amplitude in the passband of a low filter, whereas their amplitude decreases in the passband of a high filter (by about 6 db per octave above 300 Hz). Noise level is accordingly more important in this band than in that of a low filter. By using the low filter, an improvement of 6 db in a signal-to-noise ratio is obtained, which corresponds to an increase of the radar range by about 40 percent.

Empirical measurements carried out have made it possible to define certain characteristics of the primary secondary targets. It has been thus observed:

a. In presence of two simultaneous echoes having amplitudes which differ by less than 6 db, the azimuth error computer delivers an error signal characterizing the average azimuth of the targets obtained by a weighting of their respective amplitudes. If these amplitudes differ by more than 6 db the computer disregards the smallest echo.

b. The apparent surface of a small slow target (one or several pedestrians, for instance) is smaller than that of the explosion of a shell on the ground when both targets are analyzed by means of a low filter.

c. The apparent surface of a fast moving target is higher than that of the explosion of a shell on the ground (difference in levels: 10 to 20 db) when both targets are analyzed by means of high filters.

d. The resolution in range of the radar studied by way of example is about 50 meters so that two echoes at the same azimuth which are separated by less than 50 meters in range coincide, at least partially.

It is thus seen that for separating (in the tracking and error selectors) the data concerning, respectively, the primary and the secondary targets (explosion of a shell on the ground), one must take into account first, the relative

TABLE III

| 1 | 2 | 3 | 4 | 5 | 6 | 7 | 8 | 9 | 10 |
|---|---|---|---|---|---|---|---|---|---|
| | Characteristics of the Doppler filters | | Modes of operation of the radar | f c, MHz. | Displacement speed of the error strobe signal markers, km./s. | Rate of measurement (per second) | Width of the tracking gate, km. | Maximum radial speed of the shell fragments, m./s. | Expansion speed, m./s. |
| | Passband, Hz. | Radial speed, m./s. | | | | | | | |
| Low Doppler filter | 60 to 150 | 0.9 to 2.25 | 2 / 3 | 1 / 4 | 1 / 0.33 | 1 / 1 | 1 / 0.33 | 2.25 / 2.25 | 4.5 |
| High Doppler filter | 120 to 2,000 | 1.8 to 30 | 2 / 3 | 1 / 4 | 3 / 1 | 3 / 3 | 1 / 0.33 | 30 / 30 | 60 | speeds of these targets, and second, their apparent surfaces. Moreover, the tracking can be blocked during the error measurement which lasts only 1 second (time during which the primary target moves by 30 meters at most). Thirty meters is small compared to the width of the tracking gate, and accordingly, blocking the tracking for such a short time is not greatly disadvantageous.

For purposes of further description, some additional conventions will be used as follows:

I. Type F target; a primary target of small apparent surface (one or several pedestrians or a small vehicle). Such a target complies with the conditions of the paragraph b) hereabove, when it moves at a speed lower than 2.25 m/s.

II. Type M target; primary target of more significant apparent surface (automobile, armored-car, etc.). Such a target complies with the conditions of the paragraph c) hereabove, if it moves at a speed higher than 1.8 m/s.

According to the types of primary targets and their speeds, the error measurement may be carried out according to four different modes referenced E1 to E4 in Table IV.

TABLE IV

| Error measurement modes | radial speed of the main target | type of main target | Types of Doppler filters | | tracking |
|---|---|---|---|---|---|
| | | | Tracking | Error measurement | |
| E1 | <2.25 m/s | F | Low | Low | Blocked |
| E2 | | F, M | Low | High | Normal or Blocked |
| E | >1.8 m/s | M | High | Low | Normal |
| E4 | | F | High | High | Blocked |

The modes E1 and E2 used for tracking slow primary targets moving at a speed lower than 2.25 m/s will next be examined. In such a case, tracking selectors are equipped with low filters, as indicated in Table IV.

In the error mode E1, low filters are used in the error selectors and when the primary target is of the type F, the error circuits give the azimuth of the secondary target with respect to the center of the tracking gate. These same signals nevertheless influence the tracking circuits so that the tracking must be blocked during the time of observation of the secondary target. It has been previously seen that this did not present any inconvenience as, in this case, the primary target moves at most by 2.25 meters during the time of observation.

In the mode E2, high filters are used in the error selectors. Referring to FIG. 11, it will be observed that the power in the frequency spectrum of the secondary target is still appreciable in the passband of these filters.

However, this mode of operation presents several difficulties as follows:

1. The noise level is more important in this band than in that covered by the low filters (see description of FIG. 11).

2. The secondary target is also seen by the tracking filters and the tracking must be blocked if the primary target presents a small apparent surface.

3. The rate of measurement (Table III, column 7) is high.

In fact, when the main target is a slow target of type M, the measurement can be carried out only in mode E2 since the high filters of the error selectors suppress the frequency spectrum of the primary target.

The error modes E3 and E4 are used in the tracking of fast primary targets (speed higher than 1.8 m/s). In this case, the tracking selectors are equipped with high filters.

The mode E3 is used with main targets of type M (remark c) and the tracking may be carried out normally without being affected by the high frequency components of the secondary target spectrum. The error selectors are equipped with low filters and it is in this case that one obtains the best accuracies in range and azimuth error measurements. Since the signals related to the targets are well separated in the tracking selectors and in the error selectors, it is not necessary to block the tracking during that error measurement.

The mode E4 may be used with type F primary targets having an apparent surfact defined in the remark a. The error selector is then equipped with high filters and the error is measured with a precision depending on the apparent surface of the targets. The tracking must be blocked during this measurement.

As it has been stated above, the best results are obtained in the error mode E3 (error selectors equipped with low filters, main target of type M) and in operation mode 3, so that the radial speed of the fragments observed by the error measurement device is at least 2.25 m/s (expansion speed of ± 4.5 m/s).

The accuracy of the range error measurement could be on the order of ± 5 meters, if the characteristics of the filters equipping the error selectors constituted the only limiting factor. However, the video filter 40 (FIG. 1) of cut-off frequency $fc = 5$ MHz delivers a signal of duration at least equal to 0.25 $\mu$s (covering a distance of at least 37.5 meters), which is analyzed by a strobe signal of duration 0.1$\mu$s (15 meters). The resulting signal is effectively widened by this operation to about 0.45 $\mu$s (70 meters). The radar operator may then discern distances on the range cathode ray display to about ± 10 meters.

For the azimuth error, the computer 39E (FIGS. 3 and 5) delivers an output signal relating to shell fragments having a radial speed of at most 2.25 m/s. However, it will be noted that the tangential speed of these fragments may be much higher. Notwithstanding that fact, the radar derives very accurate azimuth error values in practice, typically about 2 mils at a distance of 5 kilometers. It will be recalled that the mil used in this context is 1/6400 of a full circle.

In operation mode 2, where one has $fc = 1$ MHz, the video signal is much wider and the accuracy of the measurements is only about one third of the aforementioned value.

While the principles of the above invention have been described in connection with specific embodiments and particular variations thereof, it is to be clearly understood that this description and the drawings are intended to by typical and representative only. Various other modifications and variations falling within the scope of the invention will suggest themselves to those skilled in the art.

What is claimed is:

1. A coherent monopulse radar system having a directable antenna and including means for developing sum and difference received signals each containing Doppler frequency components produced by echoes from moving targets, comprising the combination of:
- stroboscopic sampling means responsive to said received signals and controlled by an externally supplied sampling signal having a frequency slightly different from the pulse repetition frequency of said radar, whereby a predetermined portion of the repetition period of said radar may be scanned, each of said sampling pulses representing a continuously changing range increment;
- Doppler filtering means responsive to said received signal samples to produce filtered signals by passing substantially only said Doppler frequency components;
- range and angle tracking means responsive to said filtered signals for range and angle tracking a selected one of said signals corresponding to a moving primary target, said tracking means including first closed-loop control means, for causing a tracking gate to adjust its time delay position within each of said repetition periods of said radar to continuously frame said selected signal, and second closed-loop control means for causing the directivity axis of said directable antenna to follow said primary target in angle;
- a first error selector connected to measure the time delay, within the pulse repetition period of said radar, between said tracking gate and the signal of a secondary target exhibiting relatively broad Doppler spectral characteristics and therefore passing signal energy through said Doppler filtering means, thereby to determine the range error between said primary and secondary targets;
- and a second error selector responsive to relative magnitude and phase information in said sum and difference received signals and the angular position of the axis of said directable antenna for determining the angular error of said secondary target with respect to said antenna axis.

2. The invention set forth in claim 1 in which said sampling rate is defined as being slightly lower than the said radar pulse repetition frequency.

* * * * *